US008041195B2

(12) United States Patent
Vitito

(10) Patent No.: US 8,041,195 B2
(45) Date of Patent: Oct. 18, 2011

(54) VEHICLE ENTERTAINMENT SYSTEM FOR REMOTE SHARING AND STORAGE OF VIDEO CONTENT

(75) Inventor: Christopher J. Vitito, Celebration, FL (US)

(73) Assignee: Audiovox Corporation, Hauppauge, NY (US)

( * ) Notice: Subject to any disclaimer, the term of this patent is extended or adjusted under 35 U.S.C. 154(b) by 783 days.

(21) Appl. No.: 11/592,328

(22) Filed: Nov. 3, 2006

(65) Prior Publication Data

US 2007/0101371 A1 May 3, 2007

Related U.S. Application Data

(60) Provisional application No. 60/732,707, filed on Nov. 3, 2005.

(51) Int. Cl.
*H04N 5/77* (2006.01)
*H04N 5/64* (2006.01)
*H04N 7/16* (2006.01)
*H04N 7/18* (2006.01)

(52) U.S. Cl. .......... 386/362; 386/361; 348/838; 725/62; 725/75

(58) Field of Classification Search .......... 386/362, 386/361; 348/838; 725/62, 75
See application file for complete search history.

(56) References Cited

U.S. PATENT DOCUMENTS

| | | | |
|---|---|---|---|
| 6,694,200 B1 | 2/2004 | Naim | |
| 6,973,476 B1 * | 12/2005 | Naden et al. | 709/203 |
| 2001/0037360 A1 | 11/2001 | Ekkel | |
| 2002/0095680 A1 | 7/2002 | Davidson | |
| 2002/0174269 A1 | 11/2002 | Spurgat et al. | |
| 2003/0110057 A1 | 6/2003 | Pisz | |
| 2004/0002359 A1 | 1/2004 | Deas et al. | |
| 2004/0047618 A1 * | 3/2004 | Chen | 386/125 |
| 2004/0133923 A1 | 7/2004 | Watson et al. | |
| 2005/0044564 A1 | 2/2005 | Stopniewicz et al. | |
| 2005/0071375 A1 | 3/2005 | Houghton et al. | |
| 2005/0075783 A1 | 4/2005 | Wolf et al. | |
| 2005/0200697 A1 * | 9/2005 | Schedivy et al. | 348/61 |
| 2005/0227773 A1 | 10/2005 | Lu et al. | |
| 2005/0258806 A1 | 11/2005 | Janik et al. | |
| 2006/0045015 A1 | 3/2006 | Nix et al. | |
| 2006/0107295 A1 | 5/2006 | Margis et al. | |
| 2006/0109388 A1 * | 5/2006 | Sanders et al. | 348/837 |
| 2006/0119151 A1 | 6/2006 | Vitito | |
| 2006/0138308 A1 | 6/2006 | Davis et al. | |
| 2006/0181982 A1 | 8/2006 | Villevieille et al. | |
| 2006/0288376 A1 | 12/2006 | Vitito | |
| 2007/0011703 A1 * | 1/2007 | Anglin, Jr. | 725/46 |

* cited by examiner

*Primary Examiner* — Hoang-Vu A Nguyen Ba

(74) *Attorney, Agent, or Firm* — F. Chau & Associates, LLC

(57) ABSTRACT

A vehicle entertainment system includes a video system mounted within a vehicle, a video monitor for presenting video content and a video source integrated therewith. The video source is a hard drive or flash memory. The vehicle entertainment system further includes a circuit board including an input/output assembly associated with the video source for the transmission of video content. The entertainment system also includes a common support member upon which the video source and circuit board are mounted. The input/output assembly includes a means for wireless transmission of video content to the video system.

14 Claims, 4 Drawing Sheets

VEHICLE ENTERTAINMENT SYSTEM FOR REMOTE SHARING AND STORAGE OF VIDEO CONTENT

CROSS REFERENCE TO RELATED APPLICATIONS

This application claims the benefit of U.S. Provisional Patent Application Ser. No. 60/732,707, entitled "VEHICLE ENTERTAINMENT SYSTEM FOR REMOTE SHARING AND STORAGE OF VIDEO CONTENT", filed Nov. 3, 2005.

BACKGROUND OF THE INVENTION

1. Field of the Invention

The invention relates to a vehicle entertainment system. More particularly, the invention relates to a vehicle entertainment system providing for remote sharing and storage of video content.

2. Description of the Prior Art

Entertainment systems for automobiles, and other vehicles, are well known. As such, many advances have been made in the development of entertainment systems that make the otherwise tedious task of riding in an automobile more bearable. In addition to the development of overhead systems pioneered by the present inventor, systems that mount within the headrest of an automobile have also been developed. These headrest entertainment systems allow multiple individuals to view a variety of different video sources within the same vehicle.

However, and as those skilled in the art will certainly appreciate, it is desirable to provide added versatility to these entertainment systems. The present invention attempts to accomplish this by providing a video system including an integrated hard drive or flash memory and providing for remote, wireless transfer of video information to the hard drive or flash memory.

SUMMARY OF THE INVENTION

It is, therefore, an object of the present invention to provide a vehicle entertainment system including a video system mounted within a vehicle, a video monitor for presenting video content and a video source integrated therewith. The video source is a hard drive or flash memory. The vehicle entertainment system further includes a circuit board including an input/output assembly associated with the video source for the transmission of video content. The entertainment system also includes a common support member upon which the video source and circuit board are mounted. The input/output assembly includes a means for wireless transmission of video content to the video system.

It is also an object of the present invention to provide a vehicle entertainment system wherein the means for wireless transmission includes a cellular signal transceiver having a SIM card ensuring receipt of wireless video transmissions.

It is another object of the present invention to provide a vehicle entertainment system where the means for wireless transmission includes a Bluetooth® device to device short range wireless connectivity system or a Wi-Fi® network wireless connectivity system.

It is a further object of the present invention to provide a vehicle entertainment system wherein the input/output assembly includes a port for linking the video system with a remote video source.

It is also another object of the present invention to provide a vehicle entertainment system including a remote video source.

It is still another object of the present invention to provide a vehicle entertainment system wherein the remote video source is a remote video server accessed via a computer.

It is yet another object of the present invention to provide a vehicle entertainment system wherein the remote video source is a hard drive of a computer.

It is also an object of the present invention to provide a vehicle entertainment system wherein the video system is mounted within a ceiling of the automobile.

It is also a further object of the present invention to provide a vehicle entertainment system wherein the video system is mounted within a headrest of the automobile.

It is still a further object of the present invention to provide a vehicle entertainment system wherein the video system includes an expansion slot, and the common support member is shaped and dimensioned for selective and modular usage in conjunction with the expansion slot.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

Figure 1:
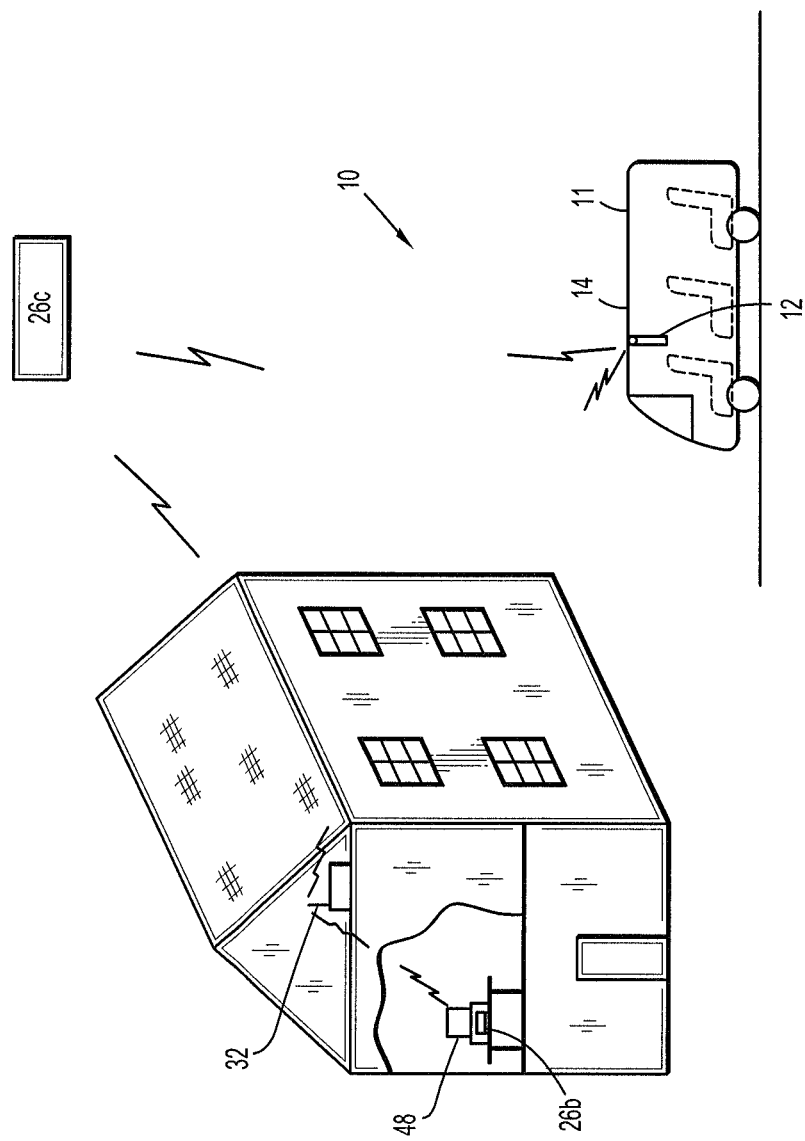
FIG. 1 is a schematic view of an automobile entertainment system in accordance with the present invention.
Figure 2:
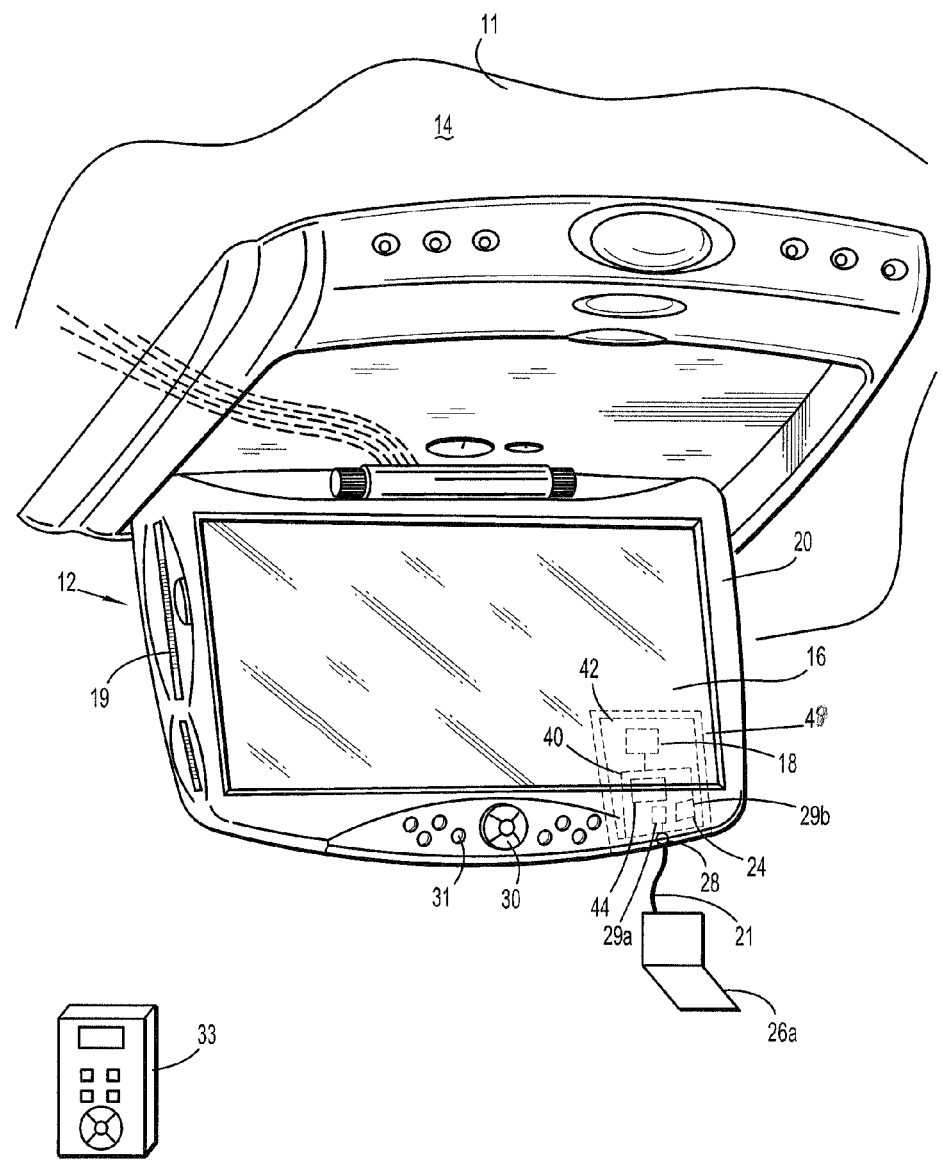
FIG. 2 is a perspective view of the video system shown in FIG. 1.
Figure 3:
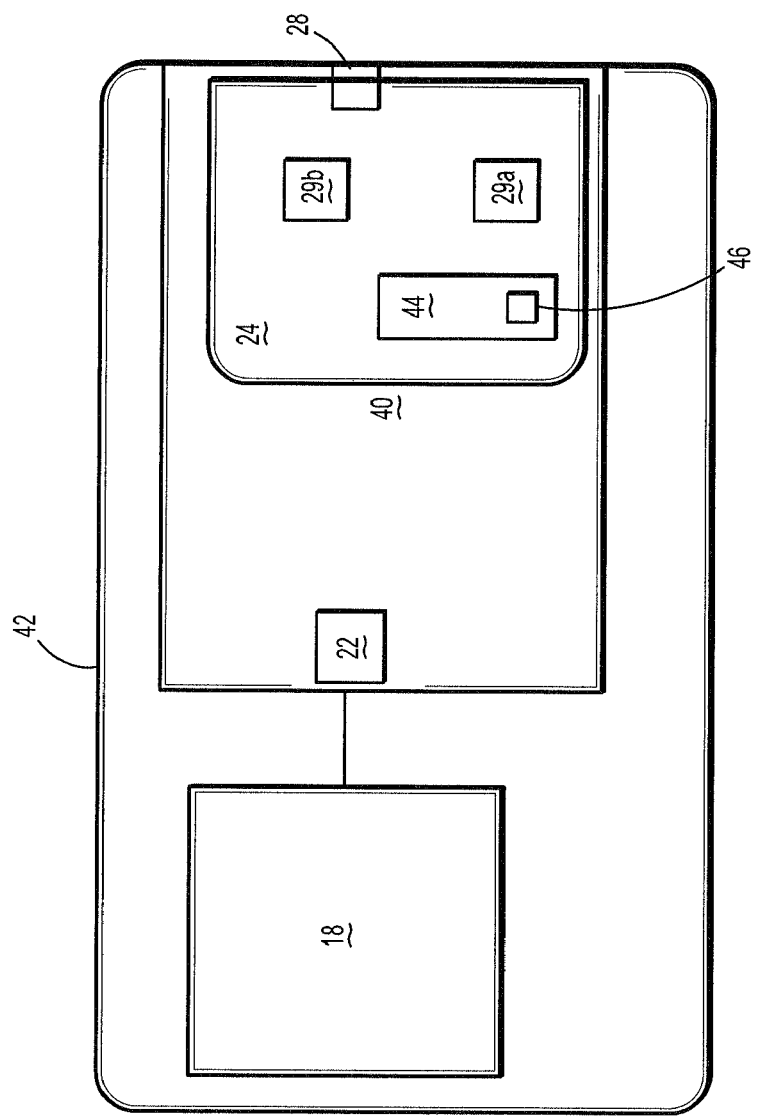
FIG. 3 is a schematic of the common support member upon which is mounted the hard drive or flash memory and the input/output assembly.

With reference to FIGS. 1, 2 and 3, and in accordance with a first embodiment of the present invention, an automobile entertainment system 10 is disclosed. The automobile entertainment system 10 is composed of a series of audio/video components integrated within an automobile 11. Although the present system is described herein for use within an automobile, the entertainment system could readily be employed in various vehicles, for example, boats or planes, without departing from the spirit of the present invention. In particular, the entertainment system 10 includes a video system 12 mounted within the ceiling 14 of an automobile 11 such that an individual sitting in the rear seat of the automobile 11 may watch the media presented on the video monitor 16 without disturbing the driver of the automobile 11. The video system 12 generally includes a video monitor 16 for presenting video content and a video source 18 integrated therewith.

Although the video system disclosed in accordance with a preferred embodiment of the present invention is incorporated within the ceiling of an automobile, the video system could be mounted in a variety of locations, for example, an automobile headrest (as discussed below), without departing from the spirit of the present invention. In addition, the video system may be detachably mounted within the vehicle in a manner providing for added versatility. For example, the video system may be detachably mounted as described in commonly owned U.S. patent application Ser. No. 11/177, 405 (published as U.S. Patent Application Publication No.

2006/0119151), entitled "Vehicle Entertainment System", filed Jul. 11, 2005, and/or Ser. No. 11/453,264, entitled "Vehicle Entertainment System with Flush Supporting Cradle", filed Jun. 15, 2006, both of which are incorporated herein by reference.

In accordance with a preferred embodiment of the present invention, the video source 18 is a hard drive or flash memory coupled to the video monitor 16 for the transmission of video content, for example, movies, television shows, music, videos, etc., thereto. As those skilled in the art will certainly appreciate, a flash memory (sometimes called "flash RAM") is a type of constantly-powered nonvolatile memory that can be erased and reprogrammed in units of memory called blocks. Although the video source is disclosed herein as being either a hard drive or a flash memory, those skilled in the art will appreciate other equivalent memory structures may be utilized without departing from the spirit of the present invention.

In accordance with a preferred embodiment, the hard drive or flash memory 18 is integrated on a common support member 42 with a circuit board 40 including an input/output assembly 24 associated with the hard drive or flash memory 18 for the transmission of video content composed of audio and video signals therebetween. As will be discussed below in greater detail, the input/output assembly 24 includes a cellular signal transceiver 44 having a SIM (subscriber identity module) card 46 ensuring receipt of wireless video transmissions in manner discussed below in greater detail. The cellular signal transceiver 44 allows the video system 12 to function much like a cellular telephone in the receipt of signals. That is, the cellular signal transceiver 44 functions as a type of shortwave analog or digital telecommunication device in which a subscriber has a wireless connection with a relatively nearby transmitter. The transmitter's span of coverage is called a cell. As the cellular telephone user moves from one cell or area of coverage to another, the telephone is effectively handed off on to the local cell transmitter.

The common support member 42 upon which the hard drive or flash memory 18 and the cellular signal transceiver 44 are mounted is integrated within the same housing 20 as the video monitor 16. The common support member may be fixedly integrated within the housing or may be constructed for selective and modular attachment to the housing via an expansion slot type design. In accordance with a preferred embodiment, the common support member 42 is shaped and dimensioned for selective and modular usage, and is selectively mounted within an expansion slot 49 formed in the housing 20. This allows the SIM card 46 and other components to be replaced as required. In addition, the video system 12 may be provided with other video sources, for example, a DVD player 19, which may be used in conjunction with the hard drive or flash memory 18 without departing from the spirit of the present invention.

As those skilled in the art will certainly appreciate, the hard drive or flash memory 18 is used by storing desired video content therein for later playback on the video monitor 16. The hard drive or flash memory 18 within the present video system 12 is provided with an associated processor 22 and the associated input/output assembly 24 discussed above. As those skilled in the art will appreciate, the processor 22 is similar to those known within the electronics industry and commonly used in providing for playback, storage, deletion, etc., in conjunction with currently available digital video recorders.

As mentioned above, the video monitor 16, hard drive or flash memory 18, circuit board 40 and associated control components are mounted within the housing 20 of the video system 12. In accordance with a preferred embodiment, the video monitor 16 is a TFT LCD screen. However, it is contemplated other monitor constructions, for example, plasma, Ultra High Definition VGA, touch screen VGA, organic LED, fabric based monitors (e.g., flexible TFI) etc., may be used without departing from the spirit of the present invention.

As for the input/output assembly 24, it is designed for connection with various remote video sources 26a, 26b, 26c to allow for the ready transfer of video content therebetween. With this in mind, the input/output assembly 24 is provided with a variety of commonly available wired and/or wireless connection structures allowing for ready connection between the input/output assembly 24 (and ultimately the hard drive or flash memory 18) and the remote video source 26a, 26b, 26c being used to transfer video content to the hard drive or flash memory 18.

In accordance with a preferred embodiment of the present invention, the hard drive or flash memory 18 is designed for receiving video content through both a wireless transmission mechanism and a wired transmission mechanism. With regard to the wired transmission mechanism, the input/output assembly 24 includes a mechanical connection structure, that is, a port, 28 for physically linking the video system 12 with a variety of known data transmission techniques, for example, Firewire, USB, DVI, etc., for connection with the hard drive or flash memory 18 and transmission of video content thereto. As such, the input/output assembly 24 is provided with an appropriate port 28 forming part of the input/output assembly 24 to which the remote video source 26a (for example, a laptop computer directly connected to the video system 12) of video content may be readily physically attached, for example, via cable 21 (see FIG. 2).

With regard to the wireless transmission of video content to the hard drive or flash memory 18, the input/output assembly 24 includes the cellular signal transceiver 44 provided with a SIM card 46 for receipt of cellular signals issued to the specific SIM card 46 and associated cellular signal transceiver 44 of the present invention. In addition, the input/output assembly 24 is provided with a Bluetooth® device to device short range wireless connectivity system 29a and/or a wireless networking system (for example, a Wi-Fi® network wireless connectivity system) 29b. By associating the hard drive or flash memory 18 with an input/output assembly 24 offering such capabilities, a user may simply transfer video content from the remote video source 26b, 26c (for example, a remote video source, such as, a hard drive or other memory source, 26b of a computer 48, or a remote video server 26c) to the hard drive or flash memory 18 without ever leaving the comfort of his or her home (see FIG. 1).

In accordance with a preferred embodiment, the transfer of video content from the remote video source 26b stored within a computer 48 is facilitated by a conventional Wi-Fi® router 32 commonly used in home networking. For example, a family getting ready to leave for a family trip, with the automobile 11 sitting in front of the house, will simply get onto their computer 48 with a remote video source 26b (for example, computer hard drive), indicate a desire to transfer video content to the hard drive or flash memory 18 for viewing during the family trip, indicate which video content is to be transferred to the hard drive or flash memory 18 and transfer the video content to the hard drive or flash memory 18 using wireless transmission, such as, a Bluetooth® device to device short range wireless connection or a Wi-Fi® network connection.

The present invention further allows for the transfer of video content from a remote video source, such as, a remote video server, 26c via the cellular signal transceiver 44 with a SIM card 46 of the input/output assembly 24. In particular, the computer 48 is loaded with software linking it to a remote video server 26c providing a source of video content. As such, and, for example, when a family is getting ready to leave for a family trip, someone will simply get onto their computer 48, access the remote video server 26c (for example, via the Internet), that is, a remote video source, select which video content they would like to watch during their trip, and instruct the remote video server 26c to transfer the video content. At which time, the remote video server 26*c*, knowing the SIM card 46 information based upon the log in identification of the person making the purchase, will send via cellular transmission the video content to the cellular signal transceiver 44 of the input/output assembly 24, which will then transfer the video content to the hard drive or flash memory 18 for later play back.

As briefly mentioned above, the housing 20 is detachably secured to the ceiling 14. It is contemplated the detachable structure will be similar to that disclosed in commonly owned U.S. patent application Ser. No. 11/177,405 (published as U.S. Patent Application Publication No. 2006/0119151), entitled "Vehicle Entertainment System", filed Jul. 11, 2005, and/or Ser. No. 11/453,264, entitled "Vehicle Entertainment System with Flush Supporting Cradle", filed Jun. 15, 2006, both of which are incorporated herein by reference.

Control of the video system 12, including the video monitor 16, DVD player 19, hard drive or flash memory 18 and other components of the video system 12, is facilitated by the provision of control buttons 30 along the outer surface of the video system 12. In accordance with a preferred embodiment of the present invention, the control buttons 30 take the form of a multifunction controller permitting movement of a cursor shown upon various interfaces displayed upon the video monitor. In addition, conventional control buttons 31 may also be provided for control of traditional functions. In addition to the provision of manual control buttons 30 and conventional control buttons 31, the video system 12 may further include a remote control 33 such that an individual need not actually touch the video system 12 to control the video system 12. Once again, and as those skilled in the art will certainly appreciate, a variety of remote control systems may be utilized without departing from the spirit of the present invention.

Figure 4:
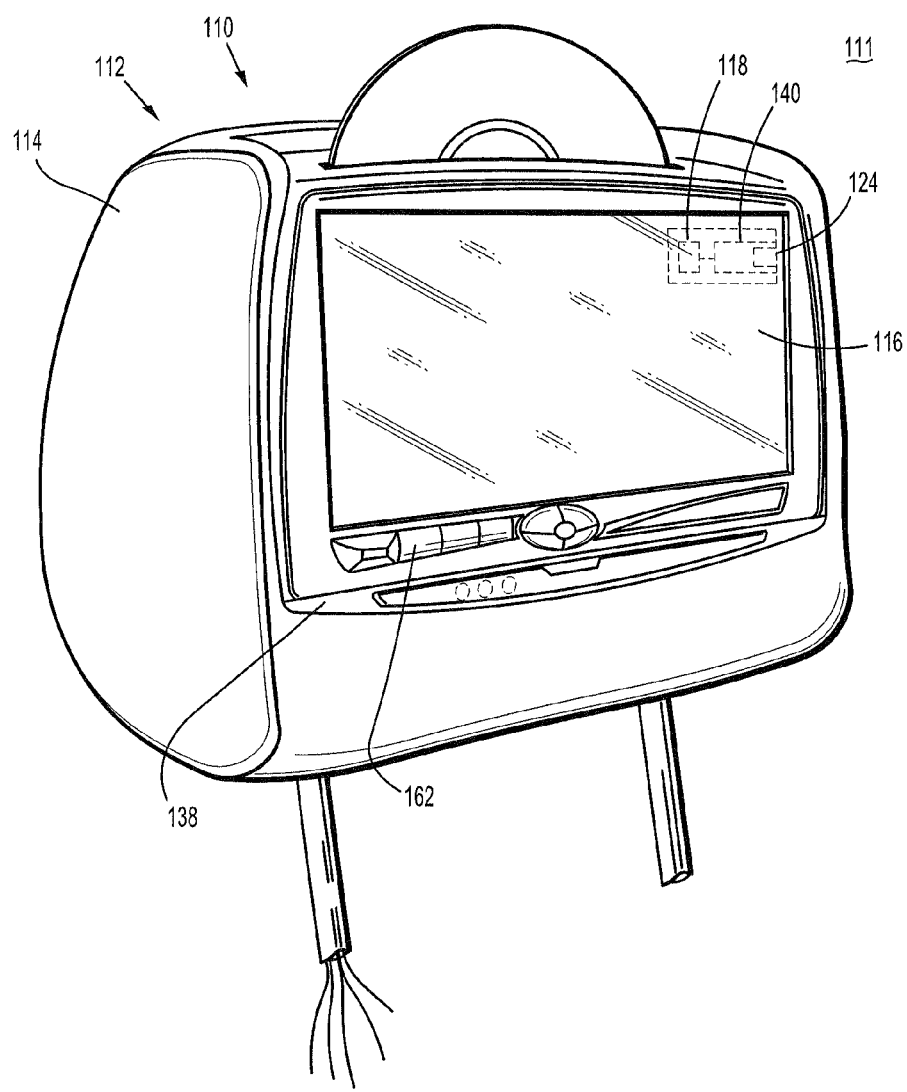
FIG. 4 is a perspective view of a video system in accordance with an alternate embodiment of the present invention.

In addition to providing for the inclusion of a removable video system 12 within the ceiling 14 of an automobile 11 as shown above with reference to FIGS. 1 and 2, it is further contemplated an entertainment system 110 providing for a selectively removable video system 112 mounted within a headrest 114 of an automobile 111 may be employed. In accordance with this alternate embodiment, and with reference to FIG. 4, the video system 112 is selectively mounted within a cradle 138 in the manner described in commonly owned U.S. patent application Ser. No. 11/177,405 (published as U.S. Patent Application Publication No. 2006/0119151), entitled "Vehicle Entertainment System", filed Jul. 11, 2005, which is incorporated herein by reference.

As with the embodiment disclosed above, the video system 112 is detachably mounted within the cradle 138 secured to the headrest 114 of an automobile 111. The video system 112 generally includes a video monitor 116 for presenting video content, a hard drive or flash memory 18 as described above, a circuit board 40 with an input/output assembly 124 as described above, and associated control components. The video system 112 also includes control buttons 162.

While the preferred embodiments have been shown and described, it will be understood that there is no intent to limit the invention by such disclosure, but rather, is intended to cover all modifications and alternate constructions falling within the spirit and scope of the invention.

The invention claimed is:
1. A vehicle entertainment system, comprising:
a video system mounted within a vehicle, a video monitor for presenting video content and a video source integrated therewith, wherein the video source is a hard drive or flash memory, and the video monitor is positioned in a housing;
a circuit board including an input/output assembly associated with the video source for the transmission of video content;
a common support member upon which the video source and the circuit board are mounted, the input/output assembly includes a means for wireless transmission of video content to the video system, wherein the video system includes an expansion slot in the video monitor housing for receiving the common support member therein, the expansion slot being positioned adjacent a free edge of the video monitor housing to provide a user with access to the common support member mounted in the slot to allow the user to selectively insert and remove the common support member comprising the video source and the input/output assembly having the means for wireless transmission to and from the slot.

2. The vehicle entertainment system according to claim 1, wherein the means for wireless transmission includes a cellular signal transceiver having a SIM card ensuring receipt of wireless video transmissions.

3. The vehicle entertainment system according to claim 2, where the means for wireless transmission includes a device to device short range wireless connectivity system or a network wireless connectivity system.

4. The vehicle entertainment system according to claim 2, wherein the input/output assembly formed on the selectively insertable and removable common support member includes a port for linking the video system with a remote video source.

5. The vehicle entertainment system according to claim 1, where the means for wireless transmission includes a device to device short range wireless connectivity system or a network wireless connectivity system.

6. The vehicle entertainment system according to claim 1, wherein the input/output assembly includes a port for linking the video system with a remote video source.

7. The vehicle entertainment system according to claim 1, further including a remote video source.

8. The vehicle entertainment system according to claim 7, wherein the remote video source is a remote video server accessed via a computer.

9. The vehicle entertainment system according to claim 7, wherein the remote video source is a hard drive of a computer.

10. The vehicle entertainment system according to claim 1, wherein the video system is mounted within a ceiling of the automobile.

11. The vehicle entertainment system according to claim 1, wherein the video system is mounted within a headrest of the automobile.

12. The vehicle entertainment system according to claim 1, wherein the common support member is shaped and dimensioned for the selective removal from and selective mounting in the expansion slot.

13. The vehicle entertainment system according to claim 1, wherein the common support member includes at least one component selectively mounted thereto to permit replacement of the component.

14. The vehicle entertainment system according to claim 13, wherein the at least one component is a SIM card.

* * * * *